(No Model.)
P. MAISONNEUVE.
FRUIT STONING MACHINE.
No. 505,206. Patented Sept. 19, 1893.
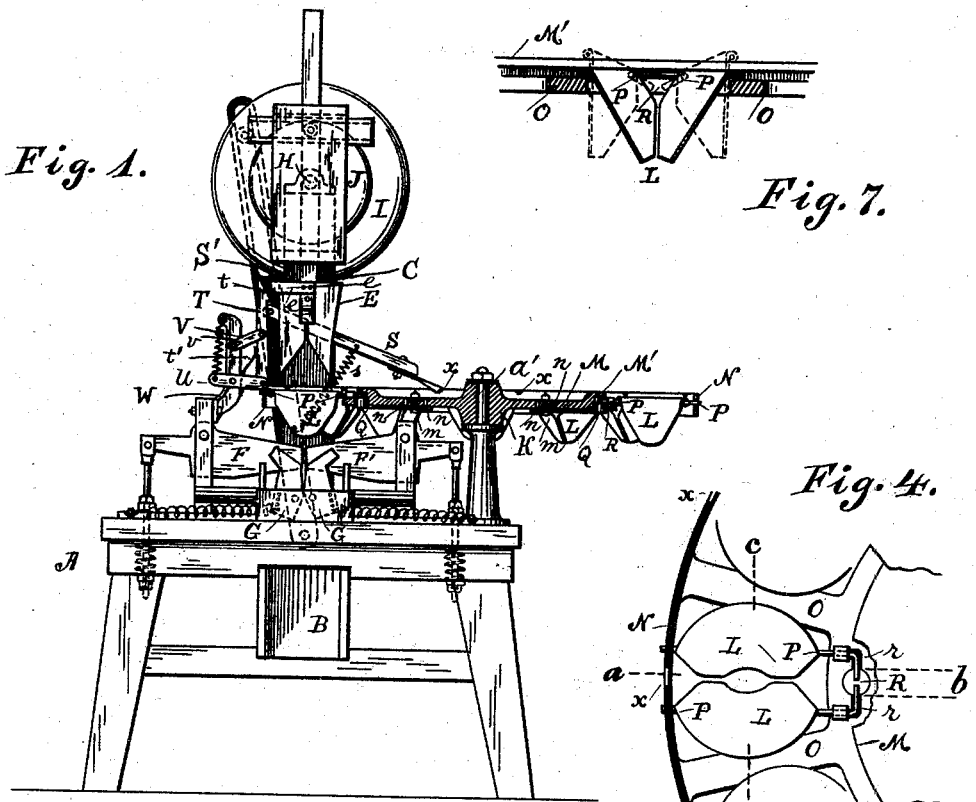
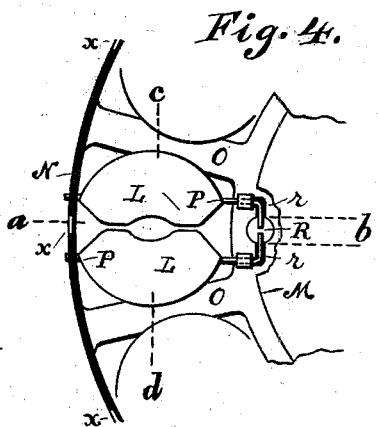
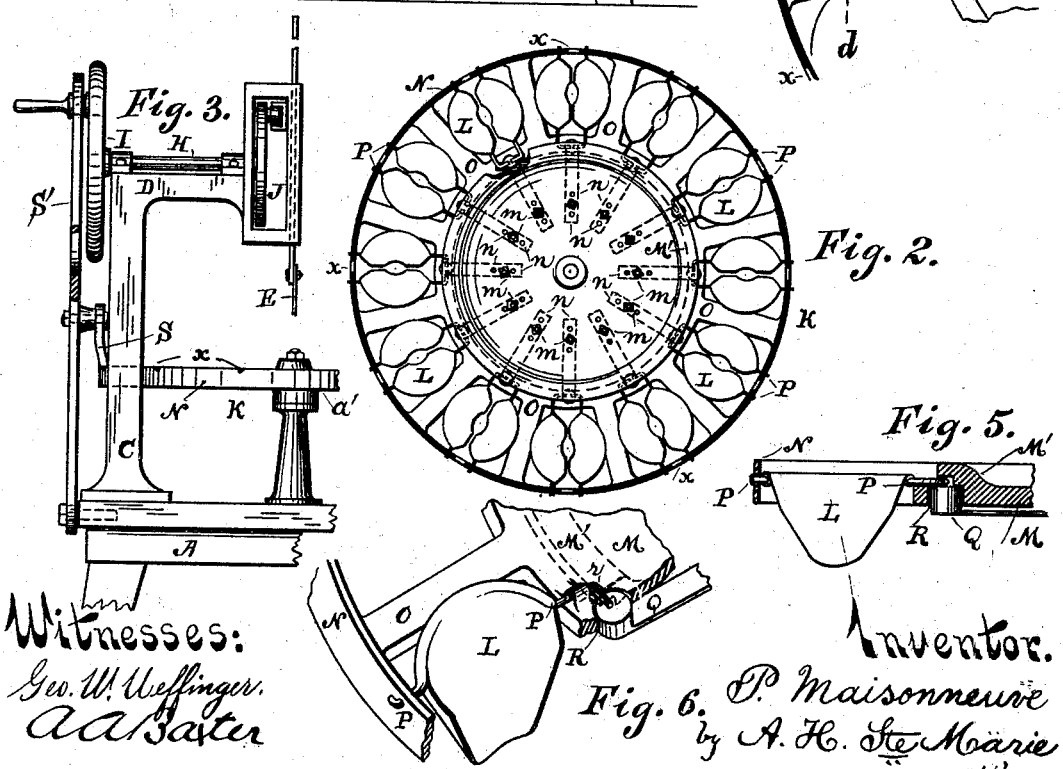
Witnesses:
Geo. W. Weffinger.
A. A. Baxter
Inventor.
P. Maisonneuve
by A. H. Ste Marie
atty

UNITED STATES PATENT OFFICE.

PAUL MAISONNEUVE, OF FRUITVALE, CALIFORNIA.

FRUIT-STONING MACHINE.

SPECIFICATION forming part of Letters Patent No. 505,206, dated September 19, 1893.

Application filed December 22, 1892. Serial No. 456,080. (No model.)

*To all whom it may concern:*

Be it known that I, PAUL MAISONNEUVE, a citizen of the United States, residing at Fruitvale, in the county of Alameda and State of California, have invented a certain new and useful Improvement in Fruit-Stoning Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists of an improvement in the fruit-stoning machine for which I have been granted Letters Patent of the United States, No. 435,651, bearing date September 2, 1890. This improvement has been devised for the purpose of enabling the users of said machine to cut and stone their fruit in any way that may be found most suitable, that is in any desired position.

Referring to the accompanying drawings, Figure 1 is a front elevation of my improved machine, showing the hopper or feed-board in section. Fig. 2 is a top view of said hopper. Fig. 3 is a broken side elevation of the machine, looking from the left of Fig. 1. Fig. 4 is a detailed view of one of the receptacles or cups forming part of the hopper or feed-board. Fig. 5 is a cross-section of said receptacle or cup on the line *a b*, Fig. 4. Fig. 6 is a perspective view of the same; and Fig. 7 is a sectional elevation taken from the line *c d* of said Fig. 4.

The same parts are indicated by the same letters of reference in all the views.

A represents the table upon which my improved machine is placed. B is one of the chutes with which said table is provided. C and D are the post and arm supporting the actuating mechanism. E, F, F' respectively indicate the two-bladed vertically-reciprocating knife and the opposite oscillating knives by means of which the fruit is cut and the flesh and stone thereof separated. G represents one of the pairs of slides used on each side of the lower knives to lead the stoned fruit down into the chutes, and H, I and J are the shaft and crank-wheels serving to operate the vertically-reciprocating knife and with it the whole machine. All these parts have been minutely described and illustrated in detail in my patent of 1890, above-cited, and are referred to herein merely to afford a better explanation of the relative location, arrangement and operation of the various parts constituting the present improvement.

K designates the improved hopper or feed-board, which is supported and adapted to rotate on a pivot *a'* upon the table A. It is composed of a series of fruit receptacles or fruit-holding cups L inserted between a circular board or plate M and a circular band or hoop N and separated by bars O connecting said board or plate with said band or hoop. Each receptacle or cup is made of two separate parts of equal size presenting a vertical opening between them and held up by wires P, the ends of which are connected with the hoop and plate in any suitable way permitting the halves of each receptacle or cup to swing thereon. The oscillation of the cup-halves or sections is normally checked, however, by means of a spring-pressed block or button Q. This block or button is secured by its spring—preferably a flat bar of steel—to the under side of the feed-board and reaches up through holes R therein as far as the wires P, the inner ends of which are inwardly curved so as to rest upon said block or button and normally keep the outer upper edges of the cups resting against the bars O. Slits *r* are provided on opposite sides of the holes R to permit the downward movement of the curved ends of the wires when the halves of the cups are forced apart. The spring of the block Q is secured to the feed-board—preferably to the plate M thereof—by means of a bolt *m* and is provided with several holes *n* through any of which said bolt may pass. The nearer the bolt is to the block the stiffer is the spring and the greater the pressure upon the wires of the cup, the halves of which may thus be made to part more or less easily according to the nature of the fruit to be placed therein. By preference, the plate M is made with a flange M' extending over the inner ends of the wires P to prevent their upward movement. This flange is shown in full lines in Figs. 1, 2, and 5, and in dotted lines in Fig.

6. The same may be replaced by a board or plate extending over the whole of the board or plate M, if desired.

The hopper or feed-board is so placed with relation to the machine that its fruit-receptacles successively pass between the knives E F F' above-mentioned and the vertical opening thereof falls in the same plane with said knives as each succeeding receptacle is brought between them. The hopper is made to stop temporarily as each cup crosses the plane within which the knives work so that the vertically-reciprocating knife may pass through the opening in each cup and cut the fruit therein as it is brought around. The turning and periodical stoppage of the feed-board are effected by means of a push-rod S and by a spring-pressed stop T. The push-rod is pivoted to and moved by a connecting-rod S' oscillated by the crank-wheel I. The stop is pivoted to and controlled by a spring-actuated lever U and link V, both of which are attached to and oscillate upon a rod or standard W secured to the machine above the knife F and by the side of the knife E. The lower ends of both the push-rod and the stop bear upon the upper edge of the hoop which encircles the feed-board, and they alternately fall into and temporarily engage with nicks or notches $x$ cut therein, the rod to give an impulse to the hopper and the stop to arrest its movement. Gravity might be relied on to keep the push-rod in contact with the hopper's edge, but this contact is better insured by means of a spring $s$ fastening said push-rod with the lower end of the oscillating rod S'. Contact of the stop with the hopper is insured by the spring-actuated lever U above-described and the spring $t'$. The push-rod is disengaged from the notches by the connecting-rod and slips back on the hopper's edge as it is withdrawn. The stop is lifted out of the notches by the knife E, which is provided with a catch $e$ adapted (preferably by a rearward extension) to engage with a corresponding catch $t$ at the upper end of the stop. A slot $v$ is made in the link V to provide for the disengagement of the catches $e$ and $t$, through backward movement of the latter and thereby re-establish or normally maintain the contact of the stop with the edge of the hopper, which slips under it while being revolved. The distance between each notch is calculated so that the push-rod will give one impulse to the feed-board and then recede to the next notch during each revolution of the crank-wheels. Similarly, the ascent of the vertically-reciprocating knife is timed so that the stop will be lifted and disengaged from the notches when the push-rod advances and fall into them as it recedes. In the drawings, the push-rod is represented as engaged with one of the notches and the stop as disengaged therefrom, both resting on the band surrounding the hopper.

The operation is as follows: The fruit being placed in the desired position in the cups of the hopper, the wheel I is turned either by hand or by power, as preferred. Motion is thereby imparted to the connecting-rod and through it and the push-rod to the hopper. This causes the cups and the fruit therein to revolve round and pass between the knives previously described, the stop falling into one of the notches $x$ as each cup comes under the knife E and temporarily checking the movement of the feed-board. In the meanwhile the knife E is brought down through the medium of the crank-wheel J and made to embrace and cut the fruit from above. While being cut the fruit is pushed down by the knife and forced through the bottom of the receptacle containing it, the halves of which part to let it pass. Then comes the cutting of the fruit from under by the oscillating knives F F' and the removal of the stone thereof as described in my said Patent No. 435,651. The fruit having been cut and stoned, the knife E is raised and with it the stop, the upper end of which is caught and thrown back by the projecting piece $e$. The feed-board is then free to turn and the push-rod again enabled to give it another impulse and so bring other fruit between the knives.

Having now described my invention, what I claim as new, and desire to secure by Letters Patent of the United States, is—

1. The combination with the rotatable table, of bails pivoted therein and having crank arms at their ends, fruit holding half-cups secured on said bails, and spring stops secured to the table and bearing on said crank arms.

2. The combination with the rotatable table, of bails pivoted therein and having crank arms at their ends, fruit holding half cups secured on said bails, spring stops secured on the table and bearing against the under sides of the crank arms, and a rail or flange on the table extending over the crank arms.

3. The combination of the table, the push rod, the standard W, the links pivoted thereto, the stop carried by said links, the knife E having an offset adapted to engage the stop, and operating mechanism all arranged and operating substantially as described.

In testimony whereof I affix my signature in presence of two witnesses.

PAUL $\overset{\text{his}}{\times}$ MAISONNEUVE.
<sub>mark</sub>

Witnesses:
 H. P. TRICOU,
 R. R. STRAIN.